3,288,719
SIEVE REGENERATION PROCESS
William J. Asher, Cranford, Patrick P. McCall, Madison Township, Middlesex County, and William R. Epperly, Murray Hill, N.J., and Imre Zwiebel, Worcester, Mass., assignors to Esso Research and Engineering Company, a corporation of Delaware
Filed Mar. 26, 1964, Ser. No. 354,992
9 Claims. (Cl. 252—416)

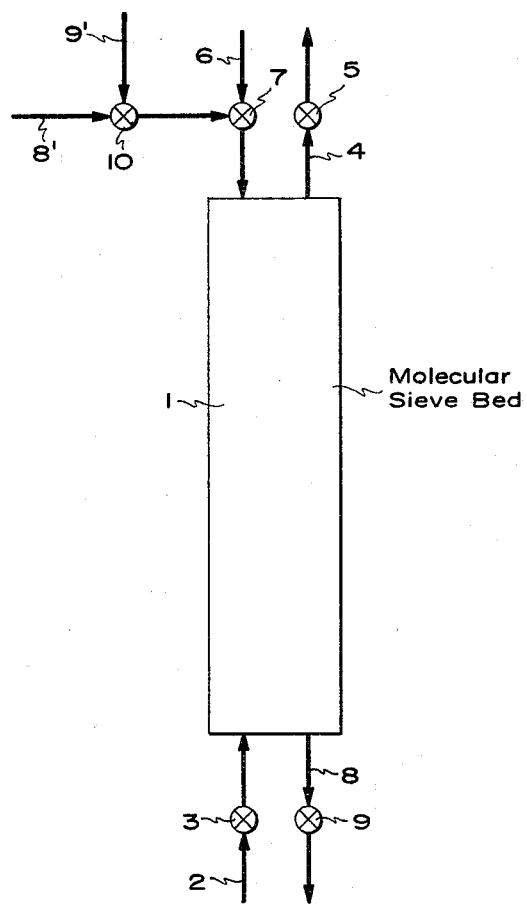

The present invention is concerned with a method of improving the over-all efficiency of a molecular sieve separation process including both the adsorption and the desorption stage and periodically restoring the adsorptive capacity of the molecular sieve adsorbent. More particularly, the present invention relates to an improved process for the efficient and economical separation and segregation of straight chain or aromatic hydrocarbons from mixtures comprising straight chain hydrocarbons, branched hydrocarbons, naphthenes and aromatics.

This invention also may be used to remove olefins, aromatics and sulfur compounds from a light naphtha feed stream by means of a molecular sieve. This type of separation is more completely described in U.S. 3,098,814 and this patent is hereby incorporated by reference. A further use for this invention would be in the separation of aromatics and/or nonhydrocarbons from saturated hydrocarbons and/or olefins and the separations of olefins from saturated hydrocarbons. Additionally, this invention may be used in the separation of linear components such as normal paraffins from hydrocarbons, particularly petroleum hydrocarbons. A further use for this invention may be found in the removal of aromatics from an olefin stream. Other varied uses for this invention will be obvious to one skilled in the art and need not be enumerated at this time. However, it should be noted that this invention may be utilized with Type A and Type X sieves; or any other porous, synthetic or natural zeolite.

It has been known for some time that certain zeolites, both naturally occurring and synthetic, have the property of separating normal from isomeric branched chain hydrocarbons, as well as from cyclic and aromatic admixtures. The zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 to 6 Angstrom units to 8 to 15 or more, but it is a property of these zeolites, or molecular sieves, that for a particular sieve the pores are substantially uniform size. The adsorbents with pore sizes of 8 to 15 Angstrom units have a high selectivity for aromatics and nonhydrocarbons. This is due to the polar nature of aromatics and the resulting interaction with the sieve surface. Thus, such adsorbents can be used to separate aromatics and nonhydrocarbons from saturates.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. An example of a class of synthetic zeolites which is used to separate normal hydrocarbons from branched hydrocarbons is Type A sieve with divalent cations from the alkaline earth sieves, particularly calcium Type A. These adsorbents are described in U.S. 2,882,243. An example of a class of adsorbents which is used to separate aromatics from saturates is Type X sieve with monovalent and divalent cations from the alkaline and alkaline earth sieves, particularly sodium and calcium Type X. These adsorbents are described in U.S. 2,882,244. Zeolites vary somewhat in composition, but generally contain silica, aluminum, oxygen and an alkali and/or alkaline earth element, e.g. sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield on dehydration, a molecular sieve having the formula $$(CaNa_2)Al_2Si_4O_{12} \cdot 2H_2O$$

Black (U.S. 2,522,426) describes a synthetic molecular sieve having the formula $4CaO \cdot Al_2O_3 \cdot 4SiO_2$. A large number of other naturally occurring zeolites having molecular sieve activity, i.e. the ability to adsorb a straight chain hydrocarbon and exclude the branched chain isomers, are described in an article, "Molecular Sieve Action of Solids," appearing in Quarterly Reviews, vol. III, pp. 293 and 330 (1949), and published by the Chemical Society (London).

The separation of normal from branched chain or aromatic hydrocarbons or mixtures, either for the purpose of enriching the mixture in branched chain, cyclic or aromatic components, or for isolating and recovering of the normal isomer, has become increasingly important to industry. Thus, in the preparation of jet and diesel fuels, the presence of normal paraffins degrades the freezing point rating. On the other hand, in the manufacture of synthetic detergents such as alkylaryl sulfonates, a straight chain alkyl substituent makes for better detergency and biodegradable characteristics than a branched chain substituent of the same number of carbon atoms. Numerous other examples can be cited.

It should be kept in mind that the process of the invention is useful for separating aromatics and nonhydrocarbons, i.e. impurities from saturated hydrocarbons. For instance, some uses of saturated hydrocarbons (normal, iso, cyclo) are as follows:

In the naphtha range as intermediate quality solvents
In the kerosene range as intermediate quality solvents, high quality kerosene for lamp oil, jet fuel
In the lube range as white oils and high V.I. oils To illustrate the applicability of this invention, reference is made to U.S. Patent 2,899,379. In U.S. 2,899,379, there is disclosed a process for separating branched chain or aromatic hydrocarbons from normal paraffin hydrocarbons. It is disclosed in this patent that normal paraffins would selectively adsorb on molecular sieves and could be subsequently desorbed by treatment with ammonia at temperatures of about 70° to about 600° F., but preferably below 400° F. The ammonia itself is recovered by heating to 600° to 800° F.

It has been found that although ammonia is a very good desorbing agent for n-paraffins and aromatics at the temperature range described above, that after a period of time, usually after many adsorption-desorption cycles, the sieve gradually loses its activity. The loss of sieve capacity has been considered to involve two factors, one of them being a decrease in the saturation capacity of the sieve, and the other that the rate of adsorption decreases so that for the same feed rate, the sieve is less fully saturated at the time that feed breakthrough occurs.

To some extent a loss in capacity may be related to the method employed for desorbing the zeolite. Thus, they may be desorbed by purging with an inert gas at 600° to 700° F., under a vacuum at 600° to 700° F., by displacement of the adsorbed straight chain hydrocarbon by a gaseous olefin such as propylene at 250° to 300° F., by raising the temperature from an adsorption temperature of about 300° F. to a desorption temperature of about 700° F. or by a combination of vacuum and heat at about 700° F. In each type of desorption, the sieve gradually loses its capacity, though not at the same rate. The temporary loss in sieve capacity is due to the gradual accumulation of hydrocarbons or hydrocarbon derivatives such as sulfur, nitrogen or oxygen-containing compounds which are not desorbable and recoverable as such. The nature of these accumulated deposits varies with the feedstock, the quantity of feed treated, operating conditions, etc. Thus, the deposits may be due to: (1) polymerization or condensation of unsaturates or other reactive components on the surface of the cavities; (2) to retention in the cavities of small amounts of polar compounds present in the feed; and (3) to possible molecular rearrangements within the highly active cavity surfaces to produce branched chain or cyclic compounds which are now too large to get out of the sieve pores; or (4) to various combinations of these or other related conversions.

It has been shown that molecular sieves may be regenerated by carbon burning with gas containing a fixed percentage of oxygen. However, this burning with oxygen technique has not been as totally effective as was hoped. When a sieve which has been desorbed with ammonia has been "burned" with oxygen to remove deposited coke, it has been found that a white powder has been consistently formed, which when deposited on the sieve would not be removed by the burning and would appreciably reduced the n-paraffin capacity of this sieve. This powder is further condensed in the cold effluent lines resulting in a general pluggage of the separation unit. It has also been found that sieve crystal structure is, on occasion, irreversibly deactivated after a burning treatment with oxygen to restore the sieve.

According to this invention, the basis for these problems which have been encountered previously after an oxygen burning treatment of a sieve has now been discovered and a solution proposed. When oxygen "burns" off depositive coke from a sieve, the combustion products are $CO$, $CO_2$, water and other gaseous products. Since ammonia has been used previously in the regular cyclic operation of the sieve, some amount of this ammonia is constantly in residence in the sieve bed.

According to this invention, it has been discovered that a reaction occurs between the ammonia and the carbon dioxide formed by the burning of the depositive coke on the sieve. This reaction forms a product, said product is theorized as being an ammonium carbamate.

Reaction 1

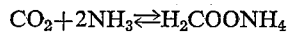

$$CO_2 + 2NH_3 \rightleftharpoons H_2COONH_4$$

Reaction 1 is well-known and has been extensively studied. For example, N. W. Krase and V. L. Gaddy reporting in "Industrial and Engineering Chemistry," vol. 14, p. 611 (1962), show data on the decomposition pressure of ammonium carbamate over the range 30° to 212° F. At 150° F., the decomposition pressure was found to be approximately 25 p.s.i.a. That is, if a mixture of two moles of $NH_3$ and one mole of $CO_2$ at 150° F. is compressed to 25 p.s.i.a. or higher, ammonium carbamate will be formed. However, at pressures below this, no carbamate was formed. This type of equilibrium phenomenon is expected for homogeneous gas phase reactions producing a solid reaction product which has a negligible vapor pressure. Furthermore, as shown by Krase and Gaddy, as temperature is increased, the reaction becomes less favorable. That is, higher and higher pressures are required to induce the formation of ammonium carbamate. For example, at 212° F., a pressure of about 110 p.s.i.a. is required. From this it can be estimated that at the conditions of operation of this invention, namely 500° F. and above, pressures far in excess of 1000 p.s.i.a. would normally be required to produce reactions of gaseous $NH_3$ and $CO_2$ to form ammonium carbamate. Nevertheless, it has been found unexpectedly that under the conditions of operation of this invention, due to the presence of the adsorbent, a reaction product of $NH_3$ and $CO_2$ is formed on the surface and in the pores of the adsorbent. Physical and chemical analysis of this reaction product have shown that it contains the carbonyl and amide structure typical of ammonium carbamate. It is, therefore, believed that, quite surprisingly, the presence of the adsorbent surface provides a sufficiently large adsorption energy to overcome the very unfavorable normal equilibrium and thereby induces formation of surface associated ammonium carbamate.

The further difficulty concerning the sieve crystal structure being irreversibly destroyed after burning is attributed, according to this invention, to the contact of ammonia with moisture at elevated temperatures. Since water is one of the products of the burning step, it is imperative to remove this moisture from the system. In the presence of water and ammonia, the cations in the sieve crystals (e.g. sodium and calcium) are exchanged at least partially with hydrogen ions. The hydrogen sieve is unstable and collapses reducing the active surface area. Carbon dioxide is also an inherent product of the burning with oxygen of a sieve bed and, consequently, the removal of the ammonia is therefore required.

This can be accomplished by running a prolonged adsorption step with feed alone, thus stripping the ammonia off the bed. This process should continue until the ammonia loading would fall below a predetermined critical value and essentially all of the ammonia (e.g. 95 to 97%) is removed, thus eliminating any appreciable direct contact between the $CO_2$ and the ammonia whereby a carbamate may be formed. If high molecular weight feeds are used in this process, such that ammonia with the feed is required to accomplish vaporization at reasonable temperature, the stripping step can be carried out either with nitrogen in place of the ammonia as a vaporizing aid for the feed, or with a lower molecular weight standby feed or at reduced pressures. The bed saturated with the feed can then be burned directly or optionally can be purged with inert gas to remove the excess burnable hydrocarbons, thus shortening the subsequent burning step. Purging with feed increases the hydrogen to carbon atomic ratio of the deposit which is contrary to the results obtained by purging with an inert gas such as nitrogen. For example, normal dodecane $(C_{12}H_{26})$ has a hydrogen to carbon ratio of about 2.17 compared with a ratio of less than 2.0 for coke on the sieve. Therefore, purging with a feed containing normal dodecane increases the hydrogen to carbon ratio. This is true for any n-paraffin purge since all n-paraffins have a ratio greater than 2. At the end of the burning step, some of the $CO_2$ and water formed during the burn remains in residence in the bed, thus an additional purge step with an inert gas or separate feed purge steps will be necessary. Since water is also one of the products of the burn, this second purge step will eliminate exposure of the sieve to a mixture of ammonia and water, previously indicated to be dangerous to the sieve's life, by cleaning out all but a small portion of this moisture. The essence of the invention will involve: (1) passing a hydrocarbon feed, a portion of which is adsorbable in the sieve crystals, through said sieve for a sufficient period so that substantially all of said $NH_3$ is removed from said sieve; (2) passing a stream of high temperature, oxygen-containing regeneration gas through said sieve to combust said carbonaceous deposits thereby forming $CO_2$ and $H_2O$; and (3) passing a dry adsorbable hydrocarbon feed through said sieve so as to remove substantially all of said $CO_2$ and $H_2O$ while adsorbing at least a portion of the said dry hydrocarbon feed into said sieve.

With more particularity, the essence of this invention may be summarized as follows: (1) At the end of an n-paraffin desorption cycle with ammonia, feed which is capable of being partially adsorbed by the sieve bed, that is to say, the long chain normal paraffins in either liquid or gaseous phase with no ammonia and less than 10 wt. p.p.m. water is passed over the bed at a temperature range of 600° to 800° F., preferably 650° to 800° F., until essentially all of the ammonia (e.g. 95 to 97%) is displaced. This step generally requires 8 to 48 hours, more preferably, 8 to 24 hours. (2) The system is then purged with inert gas such as nitrogen, argon or any of the other well-known inert gases containing less than 100 volume p.p.m. water, preferably less than 10 p.p.m., at a temperature of roughly 600° to 900° F., preferably 650° t o 800° F., until no further condensation of material at 100° F. is obtained. This step is a preferred embodiment of the invention but not a necessary one. The time required to burn the deposit is reduced by purging with inert gas but the system is operable without it and the adsorbent can be regenerated with little loss in capacity. (3) Oxygen is then blended into the dry inert gas such as nitrogen or nitrogen and carbon dioxide containing less than 100 volume p.p.m. water, preferably less than 10 volume p.p.m., and a flame front allowed to pass through the bed. The oxygen concentration is 0.25 to 3.0 wt. percent, preferably 0.5 to 1.5 wt. percent. This flame front is maintained at a temperature of no higher than 1100° F., preferably 950° F., by adjusting the oxygen concentration. (4) When the flame front has passed through the bed, full air which has been previously dried to less than 100 volume p.p.m. water, preferably less than 10 volume p.p.m., is passed over the bed at a temperature of 800° to 1100° F., preferably 900° to 1000° F. for a period of at least 3 hours and preferably 3 to 24 hours. (5) Following this, the system is purged with nitrogen or another inert gas containing less than 100 volume p.p.m. water, preferably less than 10 p.p.m. and the bed is gradually cooled to 500° to 800° F., preferably 600° to 800° F. (6) The system is then purged with fresh, normal paraffin feed containing less than 10 wt. p.p.m. water at this temperature level until all traces of carbon dioxide and water are removed from the system. After this step, the bed is cooled to the cyclic operating temperature if this is lower than the temperature in step 6. This is done by lowering the feed inlet temperature and entering feed flow. When this is completed, the bed is again operated on adsorption-desorption cycles. The invention can be fully understood by referring to both the preceding and the following description wherein reference is made to the accompanying drawing wherein FIGURE 1 is a schematic representation of the process of this invention.

Referring now to the figure. In a conventional process, feed is fed into bed 1 through line 2 which is controlled by valve 3. Sievate comes out of bed 1 through line 4 which is controlled by valve 5. Desorbing material, such as ammonia, is fed to bed 1 through line 6 which is controled by two-way valve 7. Desorbate comes off of bed 1 through line 8 which is controlled by valve 9. It should be noted that bed 1 may be maintained in either a vertical or a horizontal position. The drawing illustrates the bed in a horizontal position, but as mentioned above, this is purely optional. The bed may be regenerated at any time. Realistic figures for regeneration would be after 1,000 to 50,000 cycles, preferably 2,000 to 35,000 cycles. A still more preferred embodiment would be regeneration after one year operation or approximately 25,000 cycles. The regeneration procedure would commence after the finishing of a cycle period wherein ammonia has displaced the hydrocarbon feed. At this time, feed containing paraffins of the straight chain variety, i.e. $C_{11}$–$C_{14}$ normal paraffins is passed through the bed by means of line 2. The water content of the feed is less than 10 wt. p.p.m. The long chain normal paraffins are passed over the bed for a considerable period of time at 0.25 to 5 w./w./hr. and 15 to 50 p.s.i.a. The time may be as long as 8 to 48 hours with 8 to 24 hours being preferred. The temperature of the bed after ammonia desorption is roughly 500° to 700° F. During the extended passage of the hydrocarbon feed over the bed, the temperature may be, but is not necessarily, raised to a higher level of 600° to 900° F., preferably about 650° to 800° F. This is continued until essentially all ammonia is displaced from the bed. The presence of ammonia in the outgoing feed may be easily tested by means well-known in the art. Purging with feed increases the hydrogen to carbon atomic ratio which is contrary to the results obtained by purging with an inert gas such as nitrogen. Following this, dry inert gas which may be nitrogen or argon as well as any other inert gas is passed into the sieve bed 1 through line 8', valve 7 and line 6 at 0.2 to 1 w./w./hr. and 15 to 50 p.s.i.a. Two-way valve 7 is adjusted so that no ammonia feed is received from line 6 and the nitrogen alone from line 8 passes into the sieve bed 1. The system is purged with dry inert nitrogen gas at a temperature of 700° to 800° F. until no further condensation of hydrocarbons is obtained in a condenser held at about 70° to 150° F., preferably 100° F. At this point, the bed will contain an average hydrogen to carbon ratio of approximately 2. The entire hydrocarbon feed may remain on the bed or a part of the feed may be stripped off by means of an inert gas purge. At this point, air is blended with the dry inert gas. Air is introduced through line 9' and must pass through valve 10 to join the inert gas in line 8'. Following the partial removal of the hydrocarbons from the recycle inert gas, an oxygen-nitrogen mixture is introduced to the sieve bed through line 8' at 0.2 to 1.0 w./w./hr. and 15 to 50 p.s.i.a. The inert portion of the gas may consist of a mixture of nitrogen and carbon dioxide. The conditions utilized will cause the partial or more or less complete oxidation of the nondesorbable residual hydrocarbon or residues. Temperatures which must be held in the sieve bed to maintain combustion will vary somewhat but they should be maintained below 1100 F. Preferable temperatures would be in the range of between 900° and 1,000° F. The temperature is regulated by means of the amount of oxygen utilized. The oxygen content of the combined inert gas-oxygen mixture is 0.25 to 3% by weight and preferably 0.5 to 1.5%. The method for carrying out the oxidation in the bed consists of burning in a wave front procedure so that the temperature of the entire bed is not elevated. In this procedure, the initial temperature of the sieve and oxygen-containing gas are such that a burning front is established at the gas inlet to the sieve bed. Thus, the initial inlet bed temperature should be about 600° to 900° F. The $O_2$ concentration is picked so that the $H_2O$ concentration, resulting (directly from the $O_2$ concentration) will not significantly damage the sieve even at the highest temperatures. The burning front may be initiated by (1) preheating the oxygen-containing gas, (2) use of oxidation promoters in the gas, such as oxides of nitrogen, and (3) oxidation promoters on the sieve, such as Cu, Mn, Cr, Fe, etc. introduced either by impregnation or by ion exchange with the sieve or by other suitable means. A further advantage to this procedure will result from the use of a dry oxygen-containing gas in that the clean sieve following the burning front will be simultaneously dried in the short time held at the elevated temperature. This circulation of mixed dry inert gas and oxygen in mixture until approximately the stoichiometric quantity of oxygen to convert the deposit to $CO_2$ and $H_2O$ has been introduced to the bed. The time required to introduce the stoichiometric amount of oxygen to the bed is described by the following:

$$\text{Time, Hr.} = C \frac{\left(\frac{32}{12}\right) + 8H}{R}$$

$C$ = carbon loading, wt. fraction based on coke free sieve $H$ = hydrogen loading, wt. fraction based on coke free sieve $R$ = oxygen rate to bed, wt. per wt. coke free sieve per hour After the burning wave has passed through the bed, that is to say, after the exit temperature has dropped back to the entrance temperature, the nitrogen source from line 8 is stopped by means of two-way valve 10' and pure air through line 9' is introduced into the system. The air passes from line 9' through valve 10' and into line 6 and from there into sieve bed 2. This phase is known as secondary burning and its purpose is to remove the small portion of the deactivating deposit with high activation energy for combustion. The inlet oxygen concentration in the air is maintained at at least 16.5 wt. percent and is usually in the range of 10 to 21 wt. percent at a pressure of 15 to 50 p.s.i.a. The bed is at this time heated to a temperature of 900° to 1100° F., preferably 950° F. with the dried recirculating gas during this step and is held at this temperature for 3 to 12 hours. Although coke is more completely removed by incorporating this step, it is possible to exclude it with a slight debit in capacity.

After this burning, the bed is cooled to 600° to 800° F. This is done by circulating nitrogen through the bed. Thus, in the drawing, valve 7 is so arranged that nitrogen may flow directly into the bed from line 8'. Valve 10 is closed to the introduction of air. This circulation of 1.0 to 2.5 w./w. of nitrogen should take place for a period of about 2 to 5 hours, preferably 3 hours, and at the end of this time the bed will be cooled to the desired temperature. Simultaneously, the oxygen content in the bed is reduced to a level where it is safe to introduce feed.

The bed is then reloaded with dry straight chain normal paraffin $C_{11}$–$C_{14}$ feed which is introduced through line 2. This process of reloading will take approximately 12 to 24 hours and more probably in the vicinity of 14 to 18 hours. The feed must, of course, be dry as before and it is passed through the bed at usual operating temperatures at a rate of 0.25 to 5 w./w./hr. and 15 to 50 p.s.i.a. During this step, residual carbon dioxide and water from burning are removed from the bed and vented from the system. At the end of the step, the inlet feed temperature is lowered to the operating temperature if purging has been carried out above the operating temperature. At this time the bed has been reloaded and ammonia may once again be reintroduced to desorb the bed of hydrocarbon. In this manner the bed is exhausted of all moisture and carbon dioxide without these products contacting the ammonia which is inherent to the adsorption-desorption system. Although the above description refers to the regeneration of zeolitic adsorbents which adsorb only linear hydrocarbons, the procedure can be employed for adsorbents used to separate aromatics from saturates. In this case, all feed components are adsorbed on the bed and aid in the stripping of ammonia and of carbon dioxide and water.

In order to explain the invention more fully and for comparison, the following specific examples are set forth.

*Example 1*

Dry feed containing $C_{11}$–$C_{14}$ normal paraffins and no ammonia was passed over a bed which previously has been loaded with ammonia. The apparatus used was similar to that described in FIGURE 1 and the example will be described in conjunction with that figure. The feed was passed at a rate of 0.56 w./w./hr. The bed temperature was increased from the operating temperature of 665° to 750° F. with the flow at the start of this step. The flow continued for 16 hours. At the end of that time, 0.12 w./w. of hydrocarbon was adsorbed on the bed 1 or in the void volume of the bed 1. Bed 1 contained Linde molecular sieve adsorbent type 5A. Following this, dry inert gas which was nitrogen was introduced by means of line 8', valve 7 which was open to receive the nitrogen which passed through line 6 into sieve bed 1. The nitrogen was circulated at a rate of 0.58 w./w./hr. for a period of 2 hours. During this 2-hour period, the bed temperature was increased to 800° F. Hydrocarbon amounting to 0.007 w./w. was removed from the bed during this step. The hydrocarbon was removed from the system by condensation occurring when the circulating nitrogen was cooled to 100° F. After this dry air was introduced into the nitrogen stream through line 9' and valve 10 in sufficient concentration to bring the $O_2$ concentration to between 0.5 and 0.8 wt. percent. The actual amount of air was determined by keeping the burning front temperature between 875° and 950° F. During this time, the gas was at all times dried before introduction into the bed and a purge stream was taken off to limit the $CO_2$ concentration to 22 wt. percent. Hydrocarbon amounting to 0.006 w./w. was removed as noncombusted vapor during this step. The mol ratio of hydrogen to carbon of the material burned was between 1.5 and 2.0. Following the burning wave, dry air alone was introduced into the bed. The air was introduced through line 9', valve 10 was closed to nitrogen introduction and the air circulated down through line 8', valve 7 and line 6 into sieve bed 1. The inlet oxygen concentration was maintained at 16.5 wt. percent. The bed was heated to 950° F. with the dried gas during this step and held at that temperature for 3 hours.

At the end of this 3 hours, the oxygen flow was stopped and dry nitrogen was passed through line 8', valve 10', valve 7 and line 6 into the sieve bed 1. The bed was cooled to 665° F.

Following the cooling of the bed, the $N_2$ flow was stopped. Dry feed containing no ammonia was then passed over the bed at 750° F. and 0.56 w./w./hr. for a period of 16 hours. Ammonia was then reintroduced to the feed at a total flow rate of 1.14 w./w./hr. was passed over the bed at 665° F. At this time, normal cycling could be resumed. The bed was restored to its initial level of activity and no evidence of any white powder at all was to be seen.

*Example 2*

In this example, conditions similar to those used in Example 1 were used, with one notable exception. The bed was not exposed to the prolonged treatment with adsorbable hydrocarbon that was used in Example 1. Instead, the following sequence of operation was used:

| Operation | Time, hrs. | Temperature, °F. | Feed to bed |
| --- | --- | --- | --- |
| egen. purge and cool | 2 | 900–600 | 85% $N_2$+15% $CO_2$. |
| $H_3$ Exposure | 1 | 600 | $NH_3$. |
| esorption Range+Heat | 2 | 600–750 | 85% $N_2$+15% $CO_2$. |
| egeneration | 15 | 900 | 84.17% $N_2$, 15% $CO_2$, .33% $H_2O$, 0.5% $O_2$. |

Pressure during these operations was substantially atmospheric. This sequence of operation was repeated a total of 16 times. Capacity of the molecular sieve for normal paraffins was determined periodically and showed the following:

| Number of Regeneration Cycles | n-paraffin Capacity, w./100 w. of Adsorbent | Percent of Original Capacity Lost |
| --- | --- | --- |
| 0 | 9.79 | 0 |
| 2 | 9.26 | 5.5 |
| 6 | 9.08 | 7.3 |
| 10 | 8.18 | 16.6 |
| 16 | 7.60 | 22.1 |

At the conclusion of these operations, the adsorbent was removed from the bed and was found to be partially fouled with a white material. Subsequent physical and chemical analyses identified this material as a reaction product of $NH_3$ and $CO_2$, presumably ammonium carbamate or a related compound.

What is claimed is:

1. A process for regenerating an ammonia-containing porous crystalline zeolitic molecular sieve, the said sieve having been subjected to repeated adsorption and desorption cycles, said desorption employing ammonia which becomes adsorbed into said sieve and whereby a deactivating amount of non-desorable carbonaceous deposits have been deposited on said molecular sieve which comprises: (a) passing a hydrocarbon feed at least a portion of which is adsorbable into said sieve over said sieve for a sufficient period so that substantially all of said ammonia is removed from said sieve, (b) passing a stream of high temperature, oxygen-containing regeneration gas through said sieve to combust said carbonaceous deposits thereby forming $CO_2$ and $H_2O$, and (c) passing substantially dry adsorbable hydrocarbon feed over said sieve to remove substantially all of said $CO_2$ and $H_2O$ and at least a portion of the said substantially dry hydrocarbon feed becomes adsorbed into said sieve.

2. The process of claim 1 wherein said substantially dry hydrocarbon feed is passed over said sieve for a period of at least three hours.

3. The process of claim 1 wherein said porous molecular sieve is a 5A molecular sieve.

4. The process of claim 1 wherein said porous molecular sieve is a type X molecular sieve.

5. The process of claim 1 wherein said regeneration gas contains a maximum of 3 wt. percent of oxygen.

6. A process for regenerating an ammonia containing molecular sieve, the said sieve having been subjected to repeated adsorption and desorption cycles, said desorption employing ammonia which becomes adsorbed into said sieve and whereby a deactivating amount of non-desorbable carbonaceous deposits have been deposited on said molecular sieve which comprises: (a) passing a hydrocarbon feed at least a portion of which is adsorbable into said sieve over said sieve for a sufficient period so that substantially all of said ammonia is removed from said sieve and at least a portion of said hydrocarbon is adsorbed into said sieve, (b) purging said sieve bed with an inert gas in order to remove at least a portion of said adsorbed hydrocarbon, (c) passing a stream of high temperature, oxygen-containing regeneration gas through said sieve to combust said carbonaceous deposits thereby forming $CO_2$ and $H_2O$ and (d) passing substantially dry adsorbable hydrocarbon feed over said sieve for a sufficient period to remove substantially all of said $CO_2$ and $H_2O$ and at least a portion of the said substantially dry hydrocarbon feed becomes adsorbed onto said sieve.

7. The process of claim 6 wherein said inert gas is nitrogen.

8. The process of claim 6 wherein said molecular sieve is a type A molecular sieve.

9. A process for regenerating an ammonia-containing molecular sieve the said sieve having been subjected to repeated adsorption and desorption cycles, said desorption employing ammonia which becomes adsorbed into said sieve and whereby a deactivating amount of non-desorbable carbonaceous deposits have been deposited on said molecular sieve which comprises: (a) passing a hydrocarbon feed at least a portion of which is adsorbable into said sieve over said sieve for a period of 8 to 48 hours whereby substantially all of said ammonia is removed from said sieve, (b) purging said sieve bed with an inert gas at a temperature of 600°–900° F. in order to remove at least a portion of said adsorbed hydrocarbon, (c) passing a stream of high temperature, oxygen-containing regeneration gas at a maximum temperature of 1100° F. through said sieve to combust at least a portion of the said carbonaceous deposits thereby forming $CO_2$ and $H_2O$ and removing substantially all of the remaining portion of said hydrocarbon from the said sieve, (d) passing a stream of dry air at temperature of 800°–1100° F. for a period of 3 to 24 hours through said bed to combust the remaining carbonaceous deposits to $CO_2$ and $H_2O$, (e) cooling the said sieve bed to a temperature of 500°–800° F. by circulating dry inert gas through said bed, (f) passing substantially dry adsorbable hydrocarbon feed through said sieve bed to remove substantially all of said $CO_2$ and $H_2O$ from the said bed, the said dry adsorbable hydrocarbon feed becoming adsorbed into the said sieve.

References Cited by the Examiner
UNITED STATES PATENTS

| | | | |
|---|---|---|---|
| 2,899,379 | 8/1959 | Wilchinsky et al. | 208—95 |
| 2,908,639 | 10/1959 | Carter et al. | 208—310 |
| 3,197,397 | 7/1965 | Wight et al. | 208—111 |

OSCAR R. VERTIZ, *Primary Examiner.*

A. J. GREIF, *Assistant Examiner.*